US006754033B1

(12) United States Patent
Argumedo et al.

(10) Patent No.: US 6,754,033 B1
(45) Date of Patent: Jun. 22, 2004

(54) TAPE SURFACE CONSTRAINT OF LATERAL TRANSIENTS

(75) Inventors: Armando Jesus Argumedo, Tucson, AZ (US); Robert Glenn Biskeborn, Hollister, CA (US); Edwin Ralph Childers, Tucson, AZ (US); James Howard Eaton, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 09/641,134

(22) Filed: Aug. 16, 2000

(51) Int. Cl.[7] .................. G11B 5/584; G11B 17/00; G11B 15/60
(52) U.S. Cl. .................. 360/77.12; 360/71; 360/130.21
(58) Field of Search ............... 360/75, 71, 130.2, 360/130.21, 130.22, 130.23, 130.31, 130.32, 77.12, 77.13; 242/324; 226/196.1, 195

(56) References Cited

U.S. PATENT DOCUMENTS

| | | | |
|---|---|---|---|
| 3,037,290 A | 6/1962 | Dolby | 33/129 |
| 4,135,058 A | 1/1979 | Pfost et al. | 179/6 R |
| 4,150,773 A | 4/1979 | Fell et al. | 226/196 |
| 4,199,794 A | 4/1980 | Pfost et al. | 360/92 |
| 4,310,863 A | 1/1982 | Lelandais | 360/90 |
| 4,385,716 A * | 5/1983 | De Roeck et al. | 226/18 |
| 4,390,119 A | 6/1983 | Smetana et al. | 226/196 |
| 4,427,166 A | 1/1984 | Oishi et al. | 242/199 |
| 4,466,582 A | 8/1984 | Shiba | 242/197 |
| 4,491,891 A | 1/1985 | Shiba | 360/130.21 |
| 4,633,347 A | 12/1986 | Higgins | 360/90 |
| 5,581,419 A | 12/1996 | Kobayashi | 360/71 |
| 6,064,545 A | 5/2000 | Kletzl | 360/95 |
| 6,411,460 B1 * | 6/2002 | Fasen | 360/75 |

FOREIGN PATENT DOCUMENTS

| | | | |
|---|---|---|---|
| CH | 378058 | 5/1964 | |
| RU | 590815 | 2/1978 | G11B/15/28 |
| WO | 9844499 | 10/1998 | G11B/15/67 |

OTHER PUBLICATIONS

Capstan Surface Grooves to Improve Tape Guidance, J. W. Lewis, et al., IBM Technical Disclosure Bulletin, vol. 14, No. 3, Aug., 1971, p. 677.

* cited by examiner

Primary Examiner—Andrew L. Sniezek
(74) Attorney, Agent, or Firm—John H. Holcombe (57) ABSTRACT

A tape movement constraint is provided for a tape drive system which moves a tape longitudinally along a tape path across a tape head, the tape having longitudinal tracks. The tape head has a track following servo system for moving the head laterally for following lateral movement of the tracks, where the tape is subject to lateral transient movement. A tape roller bearing closely adjacent the tape head is rotatable about a central axis parallel to the cylindrical peripheral surface, allowing the tape freedom of movement in the longitudinal direction. The tape roller bearing has a frictional cylindrical peripheral surface for contacting and engaging the surface of the tape and constraining movement of the tape in the lateral direction, thereby reducing the rate of the lateral transient movement of the tape to allow the track following servo system to follow the reduced rate lateral transient movement of the longitudinal tracks. Any potential air bearing that could form between the surface of the tape and the surface of the roller bearing is collapsed to insure that the roller bearing frictionally contacts and engages the surface of the tape.

5 Claims, 7 Drawing Sheets

TAPE SURFACE CONSTRAINT OF LATERAL TRANSIENTS

FIELD OF THE INVENTION

This invention relates to tape drive systems for moving a tape, such as a recording tape for storing information, longitudinally across a head where the tape is subject to lateral movement, and, more particularly to tape having tracks extending in the longitudinal direction, where the tape head has a track following servo system for moving the head in the lateral direction for track following the lateral movement of the longitudinal tracks.

BACKGROUND OF THE INVENTION

Typically, tape drive systems provide tape guides for controlling the lateral movement of the tape as the tape is moved along a tape path in a longitudinal direction across a tape head. The tape may have a plurality of data tracks extending in the longitudinal direction, and the tape drive system may provide a track following servo system for moving the tape head in a lateral direction for following lateral movement of the longitudinal tracks as the tape is moved in the longitudinal direction. The track following servo system may employ servo tracks on the tape which are parallel to the data tracks, and employ servo read heads to read the servo tracks to detect position error and thereby position the tape head at the data tracks and follow the data tracks. This allows the data tracks to be placed closely together and increase the number of data tracks.

The tape is typically contained in a cartridge of one or two reels, and the tape is moved between a supply reel and a take up reel. The reels typically have runout causing the tape to move laterally as the tape is moved longitudinally. Tape guides provide the conventional means for limiting at least the amplitude of the lateral movement of the tape so that it does not exceed the lateral movement capability of the track following servo system.

In functions other than tape guiding, such as a tension roller (U.S. Pat. No. 4,310,863), an inertia roller (U.S. Pat. No. 4,633,347), or a tape timer roller (U.S. Pat. No. 3,037,290), where only longitudinal motion of the tape is concerned, high friction rollers that are in the tape path and displaced a considerable distance from the tape head, insure that the tape does not slip longitudinally with respect to the roller.

Typical tape guides may comprise stationary buttons or edges, or flanges at the side of tape guide rollers, positioned against the edges of the tape to control the amplitude of the lateral movement of the tape. In order to increase the total capacity of a tape, the tape is increasingly made thinner to allow more wraps of tape to fit on a given tape reel. As a result, the tape is very weak in the lateral direction, and can easily be damaged at the edge from the tape guide. Thus, the tape guides are typically positioned at a bearing where the tape assumes a cylindrical shape, thus increasing the tape edge ability to support a load. The bearing is also typically designed to have low friction. This arrangement minimizes the potential to distort the edge of the tape as the guides push against the edges of the tape to move the tape to the center of the bearing to reduce the amplitude of lateral displacement of the tape. One example is illustrated in U.S. Pat. No. 5,447,279, which employs an air bearing to reduce the friction of the bearing for stationary tape guides. Roller bearings may also be utilized for reducing the friction of the bearing while the flanges of the roller bearings push against the edges of the tape. One example of a roller bearing or fixed pin with flanges arranged to have low friction is U.S. Pat. No. 4,427,166. Fixed surfaces may also be arranged to have low friction. One example is described in U.S. Pat. No. 4,466,582, where a synthetic resin or metal coated tape guide bearing has a reduced contact area for the tape to lower the friction between the guide surface and the running tape and allow the flanges to stabilize the tape.

However, when wound on a reel, tape is typically subjected to stack shifts or stagger wraps, in which one wrap of the tape is substantially offset with respect to an adjacent wrap. Thus, as the tape is unwound from the reel, there is a rapid lateral transient shift of the tape. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape.

Because of the low friction of the bearing and the low mass of the tape, any rapid lateral transient shift of the tape at any point of the tape path is not slowed by the typical tape guide and is transmitted along the tape path to the tape head.

A tape head track following servo system may comprise a single actuator, or a compound, multiple element actuator.

The transient response of the tape head track following servo system typically comprises a high bandwidth for a very limited lateral movement, called "fine" track following, for allowing the tape head to accurately follow small displacements of the tape. Larger movement of the tape head is typically conducted as coarse" track following, which is also employed to shift the tape head from one set of tracks to another set, and is conducted at a slow rate. The occurrence of a lateral transient shift, however, is so rapid that neither the fine track follower nor the coarse track follower is able to respond, with the result that the tracking error becomes so large that writing must be stopped to prevent overwriting an adjacent track and to insure that the tracking error on read back is not so large as to cause a readback error.

One approach has been to make the tape guide edges or flanges closer together to maintain a pressure on both edges of the tape. However, this tends to stress and damage the edges of the tape, reducing its durability. An attempt at reducing the stress comprises spring loaded tape guides, such as the above-mentioned '279 patent. However, although the amplitude of the tape shift may be reduced somewhat by this approach, the speed of the shift is typically not reduced, and the track following servo error still occurs, reducing the performance of the tape drive.

SUMMARY OF THE INVENTION

An object of the present invention is to reduce the rate of the lateral transient movement of the tape so that the track following system may continue to track follow the longitudinal tracks of the tape.

A tape movement constraint is provided for a tape drive system. The tape drive system moves a tape along a tape path in a longitudinal direction across a tape head, the tape having tracks extending in the longitudinal direction, the tape head having a track following servo system for moving the head in a lateral direction for following lateral movement of the longitudinal tracks, where the tape is subject to lateral transient movement.

The tape movement constraint comprises at least one tape roller bearing for positioning along the tape path closely adjacent the tape head, having a cylindrical peripheral surface parallel to the lateral direction of the tape and extending a length greater than the width of the tape, for contacting a surface of the tape. The tape roller bearing is rotatable about a central axis parallel to the cylindrical peripheral surface, allowing the tape freedom of movement in the longitudinal direction.

The cylindrical peripheral surface comprises a frictional surface for contacting and engaging the surface of the tape, allowing the tape to move freely with the tape roller bearing cylindrical peripheral surface in a direction perpendicular to the central axis, and constraining movement of the tape in the lateral direction. The frictional surface limits slip in the lateral direction, thereby reducing the rate of the lateral transient movement of the tape to allow the track following servo system to follow the reduced rate lateral transient movement of the longitudinal tracks.

Thus, the tape is contacted and engaged at its surface rather than at an edge, constraining the tape in the lateral direction, providing substantial lateral drag to the tape, such that the tape is able to move laterally at a slower rate as the tape roller bearing rotates, substantially reducing the rate of the lateral transient movement. The fullest reduction is the rate of lateral movement is to substantially a velocity $V_r=V_l$ tan (theta), where $V_l$ is the longitudinal velocity of the tape and theta is the angle of the edge of the tape with a line perpendicular to the central axis of the roller.

In one embodiment, any potential air bearing that could form between the surface of the tape and the surface of the roller bearing, e.g., due to the air drawn along by the tape as it is moved rapidly, is collapsed to insure that the roller bearing frictionally contacts and engages the surface of the tape. A flat cylindrical surface is provided at the edges of the tape to fully support the tape edges.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
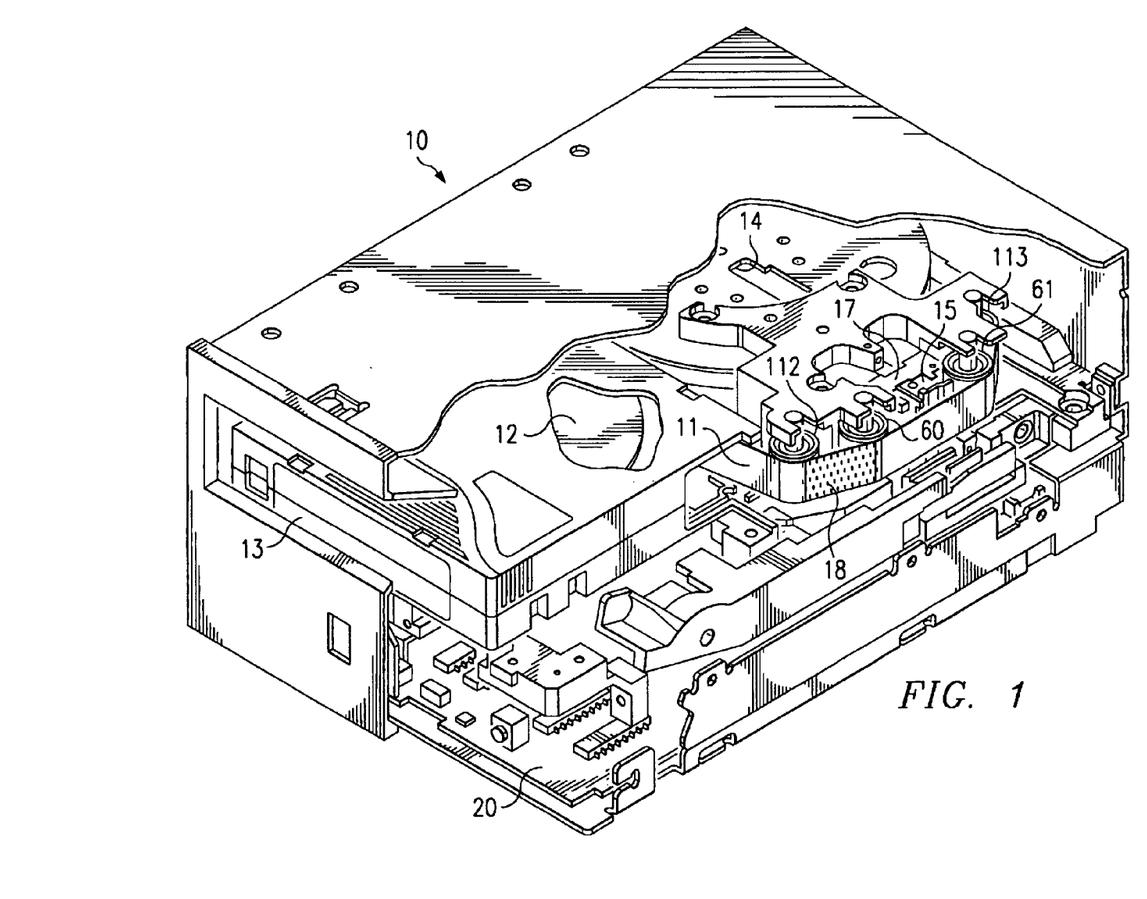
FIG. 1 is a partially cut away perspective view of a tape drive implementing the present invention.

Referring to FIG. 1, a tape drive, such as a magnetic tape drive, is illustrated which implements the present invention. A magnetic tape 11 is moved along a tape path from a supply reel 12 in a magnetic cartridge 13 to a take up reel 14, the reels comprising drive reels of a drive system operated by drive motors. The magnetic tape is moved along the tape path in a longitudinal direction across a tape head 15. The tape head is supported by an actuator 17 of a servo system, which, for example, may comprise a compound actuator. The tape head 15, for example, a magnetic tape head, may comprise a plurality of read and write elements and a plurality of servo read elements.. The tape may comprise a plurality of servo tracks or bands 18 which are recorded on the tape in the longitudinal direction on the tape which are parallel to the data tracks. The servo read elements are part of a track following servo system for moving the tape head 15 in a lateral direction for following lateral movement of the longitudinal tracks as the tape 11 is moved in the longitudinal direction, and thereby position the tape head at the data tracks and follow the data tracks.

The compound actuator may comprise a coarse actuator, such as a stepper motor, and a fine actuator, such as a voice coil, mounted on the coarse actuator. The fine actuator typically has a high bandwidth for a very limited lateral movement, called "fine" track following, for allowing the tape head to accurately follow small displacements of the tape. Larger movement of the tape head is typically conducted by the coarse actuator for centering the actuator at the average position of the fine actuator during track following, and is also employed to shift the tape head from one set of tracks to another set, and is conducted at a slow rate. An example of a compound actuator is described in coassigned U.S. Pat. No. 5,793,573, and those of skill in the art understand that many differing types of actuators may be employed in implementing the present invention.

The tape drive 10 additionally comprises a controller 20 which provides the electronics modules and processor to implement the servo system to operate the compound actuator.

Figure 2:
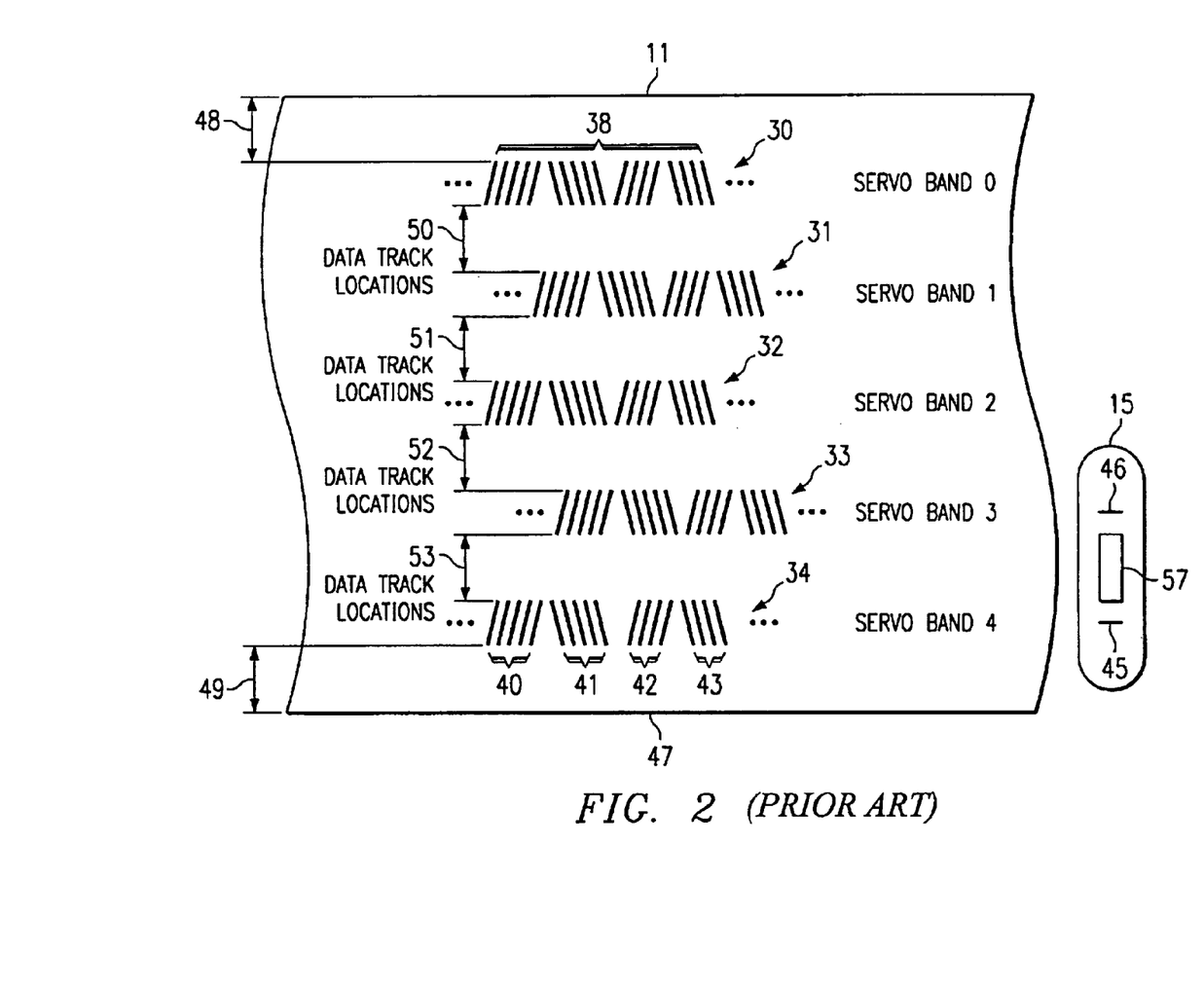
FIG. 2 is a diagrammatic representation of a prior art magnetic tape having multiple timing based servo tracks which may be employed in implementing the present invention.

The magnetic tape 11 of the present example may be provided in a tape cartridge or cassette 13 having a supply reel 12 or having both the supply and take up reels. Referring additionally to FIG. 2, the servo tracks or bands 18 may comprise any of several types of longitudinal servo patterns as is known to those of skill in the art. In the example of FIG. 2, a timing based servo pattern is illustrated, which is described in coassigned U.S. Pat. No. 5,689,384, and which comprises magnetic transitions recorded at more than one azimuthal orientation across the width of the servo track. In the specific example of FIG. 2, five longitudinal timing based servo tracks 30–34 are prerecorded on the magnetic tape 11 for track following at these positions. The pattern of magnetic transitions recorded in the servo tracks is a repeated set of frames 38, each of which are of different azimuthal orientations. In the example of FIG. 2, the tape head 15 comprises at least two narrow servo read elements 45, 46, allowing two servo tracks to be sensed simultaneously, and the outputs used redundantly to reduce error rates.

In the example of FIG. 2, lateral position sensing within a servo track is achieved by deriving a ratio of two servo pattern intervals and is insensitive to tape speed. Specifically, the lateral position may be the ratio of (1) the distance between transitions of bursts 40 and 41, called the "A" distance, to (2) the distance between transitions of bursts 40 and 42, called the "B" distance. Thus, as the tape head servo read elements 45, 46 move toward the edge 47 of the tape 11, the ratio of the distance between the transitions of bursts 40 and 41 to the distance between the transitions of bursts 40 and 42 becomes greater, since the distance between the "A" transitions of bursts 40 and 41 is greater, while the distance between the "B" transitions of bursts 40 and 42 remains unchanged. What is actually measured are time $T_A$ and $T_B$ between the transitions defining the "A" and "B" distances which vary with tape speed. Since the "B" distance is unchanged at various lateral positions, the ratio $T_A/T_B$ is the same as "A"/"B" and is insensitive to tape speed. Still referring to FIG. 2, the magnetic tape 11 may be provided with guard bands 48, 49 at the edges of the tape, and four data track regions 50–53 are provided between the servo tracks. A plurality of read and write elements 57 are provided at the tape head 15 for reading and/or writing data on the tape 11. When the servo elements 45, 46 are properly positioned at the specific servo tracks 30–34, the read and write elements 57 are properly positioned to transfer data with respect to the corresponding data track locations of the tape 11.

Figure 3:
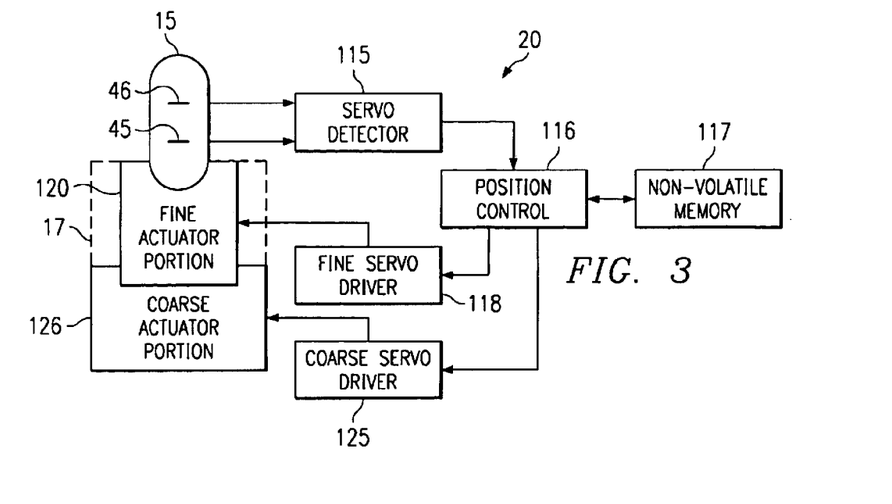
FIG. 3 is a block diagram of an exemplary servo system which may be employed in the tape drive of FIG. 1 in implementing the present invention.
Figure 4A:
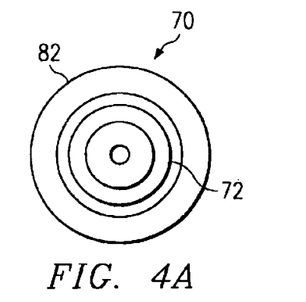
FIGS. 4A, 4B, 4C, and 4D comprise isometric views, one partially cutaway, illustrating one embodiment of roller bearings in accordance with the present invention, which may be employed in the tape drive of FIG. 1.
Figure 4B:
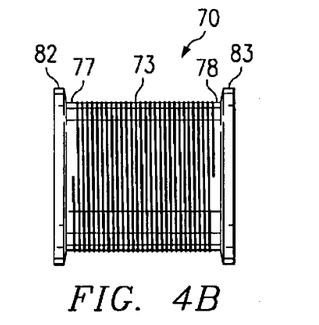
Figure 4C:
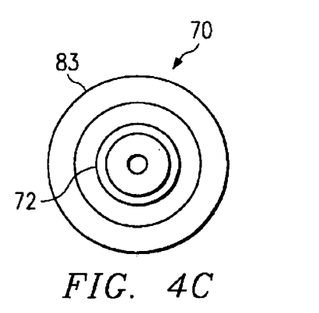
Figure 4D:
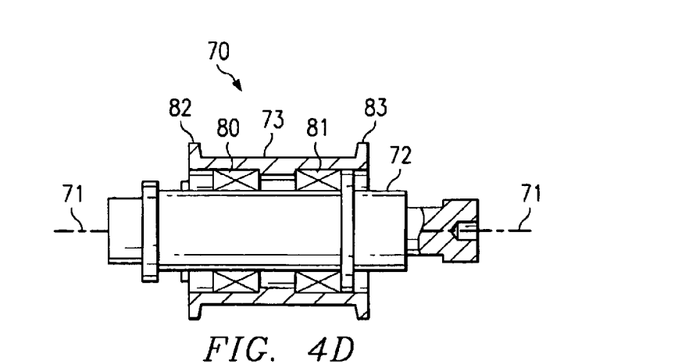

An exemplary servo system is illustrated in FIG. 3, comprising elements of controller 20 in which a servo detector 115 is coupled to the servo elements 45, 46 of the tape head 15. A position control 116 is provided and may comprise a microprocessor, such as an Intel i930, with an attached nonvolatile memory 117 for storing information and programming for the position control. The position control 116 provides, for example, digital servo output data for operating the compound actuator 17. Those of skill in the art will understand that various devices are available to provide the needed signals for the servo detector and position control functions. A fine servo driver 118 converts track following servo output data to the appropriate drive signals for operating a fine actuator portion 120, and a coarse actuator driver 125 converts the coarse servo output data to, for example, appropriate step drive signals for operating a coarse actuator portion 126. The servo detector 115 and drivers 118 and 125 may also comprise electronic modules of the controller 20.

The data tracks are typically narrow and closely spaced, and the tape 11 is typically very thin with little lateral stiffness at the edge. Tape edge guides may be provided which push against the edge of the tape to prevent excessive lateral movement of the tape, for example, from runout of the supply reel 12 or the take up reel 14, at least from the standpoint of the amplitude of the movement of the tape. However, when wound on a reel, tape is typically subjected to rapid lateral transient shifting, for example, from stack shifts or stagger wraps, in which one wrap of the tape is substantially offset with respect to an adjacent wrap. Other common sources of rapid lateral transient shifts include 1) a buckled tape edge in which the tape crawls against a tape guide flange and suddenly shifts laterally back down onto the bearing, 2) a damaged edge of the tape which causes the tape to jump laterally when contacting a tape guide, and 3) when the take up reel or supply reel runout is so significant that the reel flange hits the edge of the tape.

The fine actuator track following typically comprises a high bandwidth for a very limited lateral movement and therefore limited transient response for allowing the tape head to accurately follow small displacements of the tape. The coarse actuator provides larger movement of the tape head for track following, which is also employed to shift the tape head from one set of tracks to another set, and is conducted at a slow rate. However, the typical lateral transient shift is so rapid that neither the fine track follower nor the coarse track follower is able to respond, with the result that the tracking error exceeds the allowable threshold, and a PES error occurs.

The tape movement constraint in accordance with the present invention is directed to reducing the rate of the lateral transient movement of the tape so that the track following system may continue to track follow the longitudinal tracks of the tape.

Referring to FIG. 1, the tape movement constraint comprises at least one tape roller bearing 60, 61 for positioning along the tape path closely adjacent the tape head, having a cylindrical peripheral surface parallel to the lateral direction of the tape and extending a length greater than the width of the tape, for contacting a surface of the tape. Referring additionally to one embodiment of the present invention in FIGS. 4A–D, and an alternative embodiment in FIG. 5, the tape roller bearing 70 is rotatable about a central axis 71, for example, of a bearing shaft 72, parallel to the cylindrical peripheral surface 73, allowing the tape freedom of movement in the longitudinal direction.

The cylindrical peripheral surface comprises a frictional surface for contacting and engaging the surface of the tape and constraining movement of the tape in the lateral direction, for example peripheral surface 73, while not increasing friction in the longitudinal direction, thereby reducing the rate of the lateral transient movement of the tape to allow the track following servo system to follow the reduced rate lateral transient movement of the longitudinal tracks.

Thus, the tape is contacted and engaged at its surface rather than at an edge, limiting lateral slip and providing substantial lateral drag to the tape, while the tape rolls freely with the tape roller bearing as the tape roller bearing rotates, substantially altering the transient characteristics of the tape and reducing the rate of the lateral transient movement. Specifically, the cylindrical peripheral surface 73, being rotatable about a central axis 71, prevents an increase in the longitudinal drag on the tape. Thus, undesirable forces and stresses on the tape are prevented. At the same time, as the result of the substantial lateral drag provided by the lateral constraint of the frictional cylindrical peripheral surface 73, the rate of lateral movement is reduced. The fullest reduction in the rate of lateral movement, which assumes no lateral slippage and ideal alignment of the central axis 71, is to substantially a velocity $V_r=V_l$ tan (theta), where $V_l$ is the angle the tape edge makes with the direction of the longitudinal velocity, specifically, with a line perpendicular to the central axis 71 of the roller bearing. To move at a high lateral velocity, the tape must overcome the frictional contact of the cylindrical peripheral surface 73. This constraint thereby substantially reduces the lateral velocity of the tape from that which would occur if the tape were free to slide over the bearing surface.

In the embodiments of FIGS. 4A–D and 5, the tape roller bearing frictional cylindrical peripheral surface 73 comprises a plurality of lands 75 separated by grooves 76. The lands extend about the cylindrical peripheral surface 73 in a circumferential direction generally parallel to the longitudinal direction that the tape is moved. Any potential air bearing that could form between the surface of the tape and the surface of the roller bearing, e.g., due to the air drawn along by the tape as it is moved rapidly, is collapsed to provide contact between the tape surface and the lands 75 for engaging the surface of the tape. In this example, the lands 75 and grooves 76 extend in the circumferential direction at an acute angle to the longitudinal direction, thereby forming a helical pattern. As an example, the lands may be as little as 30% of the combined width of a groove and land. The helical pattern of the frictional cylindrical peripheral surface extends laterally a length less than the width of a tape, to prevent generation of a trench into the surface of the tape by any one land, e.g., if the lands were non-helical. In order to reduce wear of the tape, the cylindrical peripheral surface lands 75 may be radiused 79 at the grooves 76. As an example, for lands of 0.10 mm, the radius should not exceed 0.02 mm.

The cylindrical peripheral surface 73 is ungrooved at each side of the land and groove pattern at each edge of the tape to form smooth cylindrical surfaces 77 and 78 to fully support the tape at the edges. The smooth support tends to prevent distortion of the tape at the edges and to prevent damage to the tape.

The tape roller bearing 70 is an idler bearing which is rotated by the tape as it is moved longitudinally. The tape roller bearing may rotate on shaft 72 by means of ball bearings 80 and 81, or by an air bearing, or other bearings as are known to those of skill in the art. Flanges 82 and 83 of the embodiment of FIGS. 4A–D are optional and may be provided to insure that the tape will not move off the tape roller bearing when the tape tension is reduced or to prevent excessive lateral movement of the tape due to axial misalignment of the tape roller bearing.

Figure 5:
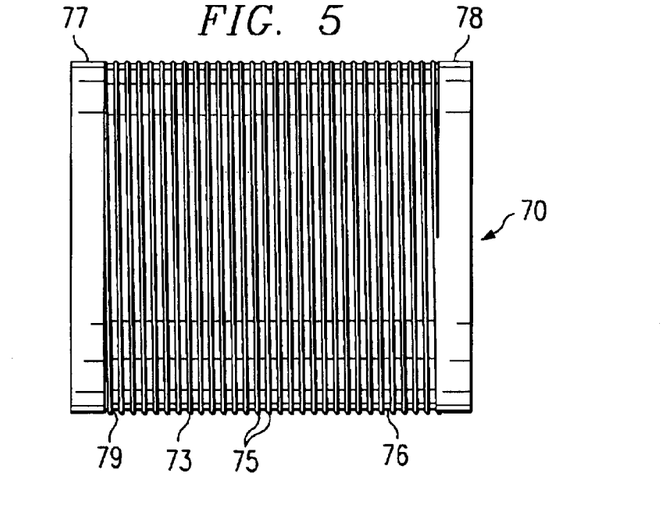
FIG. 5 is an enlarged view of an alternative embodiment of the roller bearing of FIG. 4B.

In the embodiment of FIG. 5, the flanges are removed, and the smooth cylindrical surfaces 77 and 78 extend to the edges of the tape roller bearing 70. In this embodiment, any excessive amplitude lateral movement could be prevented by conventional tape guiding at adjacent locations.

Hence, the tape roller bearing frictional peripheral surface 73 of the embodiments of FIGS. 4A–D and FIG. 5 contacts and frictionally engages a tape at its surface, reducing the rate of any lateral transient movement of the tape.

Figure 6A:
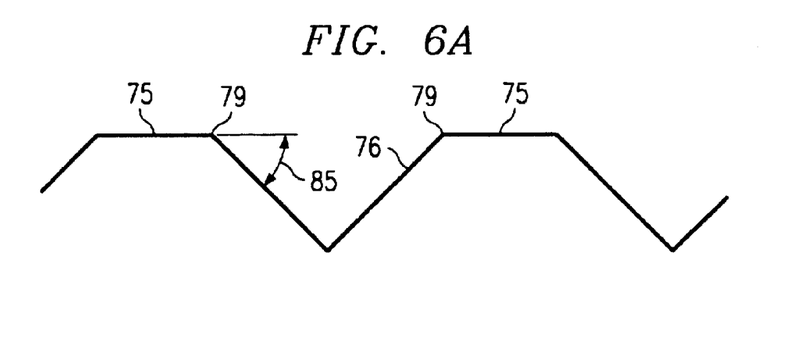
FIGS. 6A and 6B a diagrammatic representations of alternative embodiments of peripheral surfaces of the roller bearing of FIG. 5 in accordance with the present invention.
Figure 6B:
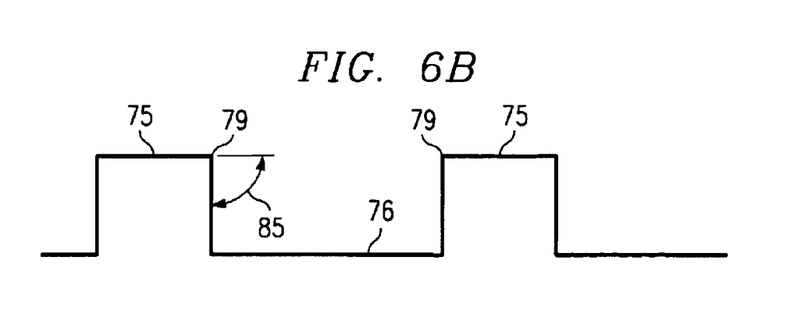

Referring to FIGS. 6A and 6B, the grooves 76 of the tape roller bearing may comprise any angle 85 with respect to the lands 75, and any depth, that will assure that entrapped air is bled from between the tape and the cylindrical peripheral surface so as to collapse any air bearing. It has been found that appropriate angles comprise any angle in a range of substantially 45°, as shown in FIG. 6A, to substantially 90°, as shown in FIG. 6B. The tape roller bearing may be made, for example, from a metal, such as aluminum which is machined to form the respective lands and grooves. The radii 79 of the cylindrical peripheral surface lands 75 at the grooves 76 are also illustrated. Alternatively, the tape roller bearing 70 may comprise a molded plastic or resin. Those of skill in the art will understand that various materials and techniques may be employed to provide the roller bearing tape movement constraint of the present invention.

Figure 7A:
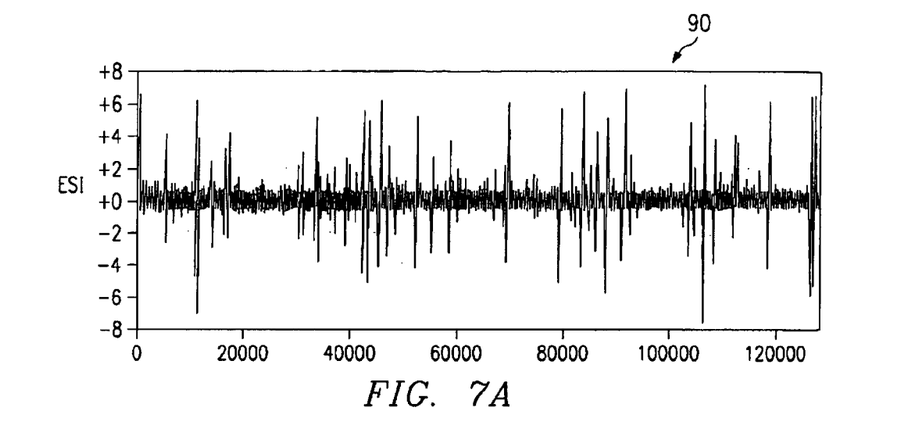
FIGS. 7A and 7B are graphical representations of the instantaneous position error between a tape head and the servo tracks, respectively without and in accordance with the present invention, upon a take up reel hitting the tape;.
Figure 7B:
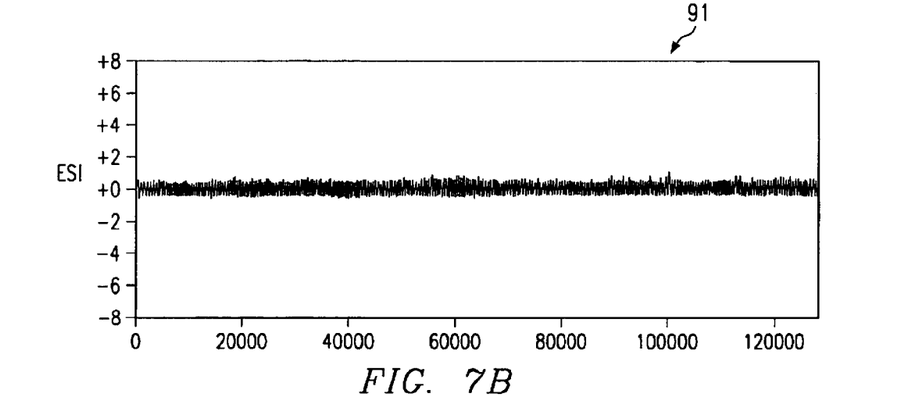

FIGS. 7A and 7B comprise before and after position error characteristics of the tape at the tape head which illustrate the effect of the grooved roller bearing 70 of FIGS. 4A–D and 5 when the tape is hit by the flange of a take up reel, such as reel 14 of FIG. 1. In the example of FIGS. 7A and 7B, the tape drive may be bidirectional, and the tape is moving in the forward direction, winding onto the take up reel. In FIG. 7A, a conventional tape guide is employed, and the position error 90 illustrates dramatic and rapid lateral transient shifts, such that the track following servo system is unable to respond, with the result that the track that was being followed is lost, and a servo error occurs.

In contrast, the cylindrical peripheral surface 73 of the grooved roller bearing 70 contacts and engages the surface of the tape and controls movement of the tape in the lateral direction, hereby reducing the rate of the lateral transient movement of he tape to allow the track following servo system to follow the educed rate lateral transient movement of the longitudinal racks, as shown by the small position error 91 of FIG. 7B.

Figure 8A:
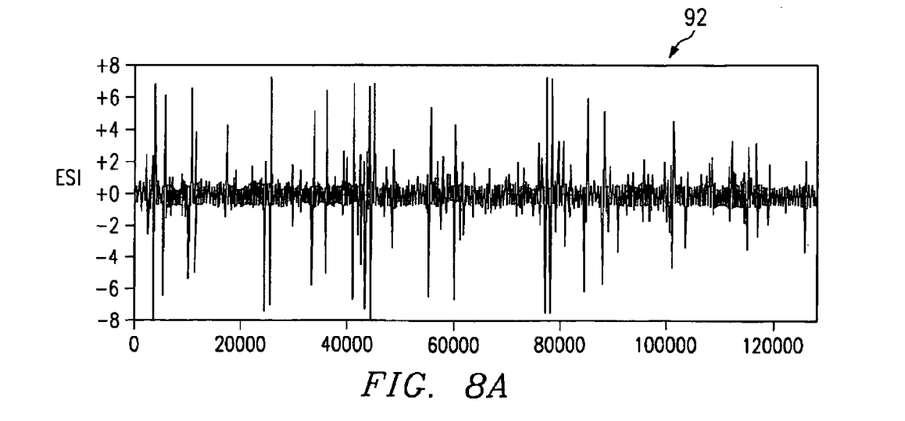
FIGS. 8A and 8B are graphical representations of the instantaneous position error between a tape head and the servo tracks, respectively without and in accordance with the present invention, as the result of a stack shift or stagger wrap at supply reel.
Figure 8B:
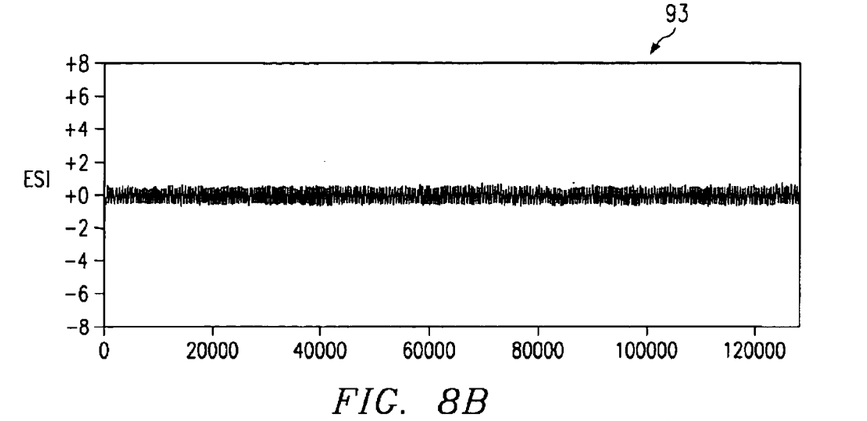

FIGS. 8A and 8B similarly illustrate the effect of the grooved roller bearing 70 with before and after position error characteristics of the tape at the tape head upon the occurrence of a lateral transient due to stack shifts or stagger wraps, in which one wrap of the tape is substantially offset with respect to an adjacent wrap. In FIG. 8A, the conventional tape guide results in dramatic and rapid lateral transient shifts, as the illustrated by the position error 92, whereas the cylindrical peripheral surface 73 of the grooved roller bearing 70 contacts and engages the surface of the tape and controls movement of the tape in the lateral direction, thereby reducing the rate of the lateral transient movement of the tape to allow the track following servo system to follow the reduced rate lateral transient movement of the longitudinal tracks, as shown by the small position error 93 illustrated in FIG. 8B.

Figure 9A:
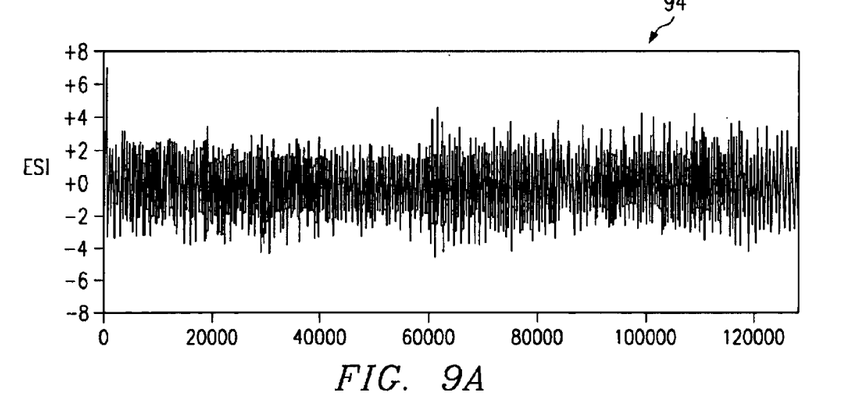
FIGS. 9A and 9B are graphical representations of the instantaneous position error between a tape head and the servo tracks, respectively without and in accordance with the present invention, upon a supply reel hitting the tape.
Figure 9B:
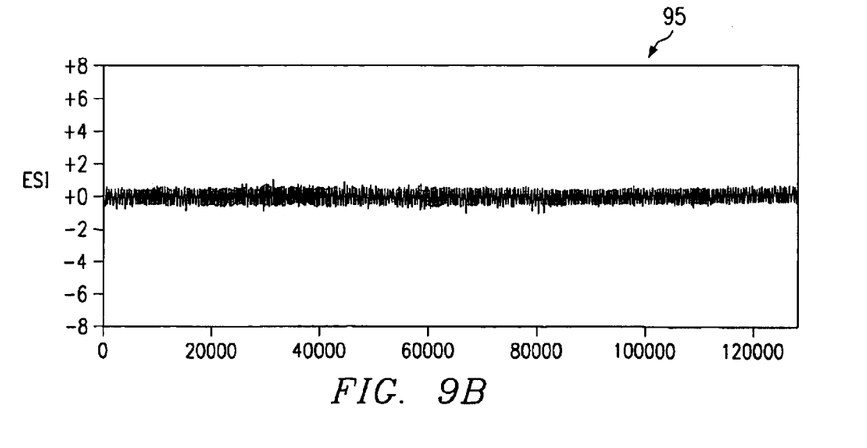

FIGS. 9A and 9B illustrate the before and after position error characteristics of the tape at the tape head when a cartridge flange, such as the flange of supply reel 12 of FIG. 1, hits the tape. In FIG. 9A, in the example, the tape is moving in the reverse direction, winding on to the supply reel 12. The illustrated position error 94 shows substantial and rapid lateral transient shifts, whereas the cylindrical peripheral surface 73 of the grooved roller bearing 70 contacts and engages the surface of the tape and controls movement of the tape in the lateral direction, thereby reducing the rate of the lateral transient movement of the tape to allow the track following servo system to follow the reduced rate lateral transient movement of the longitudinal tracks, as shown by the small position error 95 illustrated in FIG. 9B.

Figure 10:
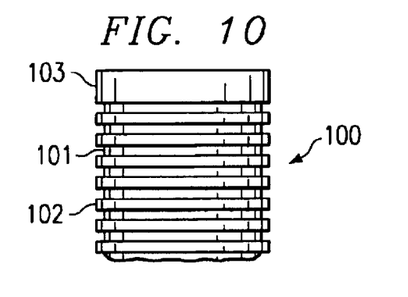
FIG. 10 is a partial front view of an alternative embodiment of a roller bearing in accordance with the present invention.

FIG. 10 illustrates an alternative embodiment of a grooved roller bearing 100 in accordance with the present invention, wherein the grooves 101 and lands 102 are substantially parallel to the longitudinal direction of the tape motion and a smooth cylindrical surface 103 is provided at each edge of the bearing to support the tape edges.

Figure 11:
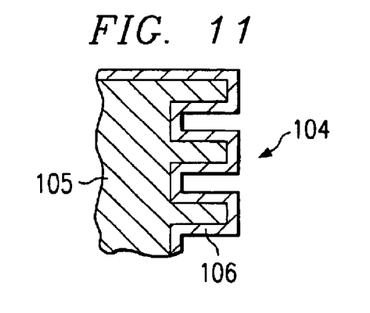
FIG. 11 is a partial cross sectional view of another alternative embodiment of a roller bearing in accordance with the present invention.

FIG. 11 illustrates a further alternative embodiment of a grooved roller bearing 104. The roller bearing comprises a base material 105, such as aluminum, coated with an elastomeric coating 106 for engaging the tape. The coated roller bearing may appear the same as the helically grooved bearings of FIGS. 4A–D and 5, or as the longitudinally grooved bearing of FIG. 10. The elastomeric coating may have a high coefficient of friction, but cannot be "sticky" or cling to the tape, since it allows the tape to move freely in the longitudinal direction.

Figure 12:
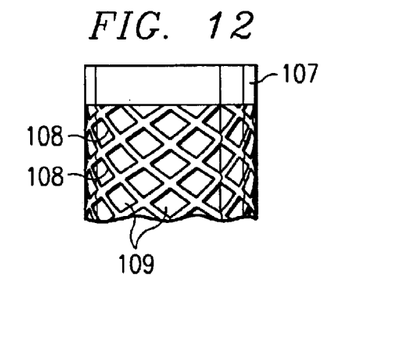
FIG. 12 is a partial front view of still another alternative embodiment of a roller bearing in accordance with the present invention.

FIG. 12 illustrates two alternative embodiments of a roller bearing in accordance with the present invention. In a grooved peripheral surface, such as a machined set of grooves, the grooves 108 extend in a double helix crossing pattern, such that the lands 109 form islands for engaging the surface of the tape. In a textured surface of an elastomeric material, which may be molded, the textured surface may comprises a negative crosshatch "waffle" pattern of protruding islands 109 above recessed grooves 108, the protruding islands for contacting and engaging the surface of the tape, and the recessed grooves allowing entrapped air to bleed from between the tape and the cylindrical peripheral surface to collapse any air bearing thereat. A smooth cylindrical surface 107 is provided at each edge of the bearing to fully support the tape edges.

Figure 13:
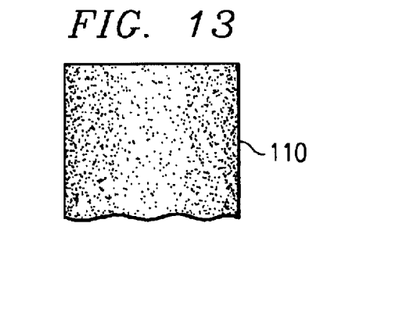
FIG. 13 is a partial front view of a further alternative embodiment of a roller bearing in accordance with the present invention.

FIG. 13 illustrates a still further alternative embodiment of the present invention, wherein the tape roller bearing frictional cylindrical peripheral surface 110 comprises a roughened surface having protrusions for contacting and engaging the surface of the tape, and having voids allowing entrapped air to bleed from between the tape and the cylindrical peripheral surface to collapse any air bearing thereat. The roughened surface 110 may be generated by sandblasting or by molding. The surface 110 is sufficiently supportive that a smooth surface at the tape edges is not required, thereby allowing air to bleed at the tape edges.

Those of skill in the art understand that still further alternative peripheral surfaces and techniques for manufacturing the roller bearing may be envisioned.

As illustrated in FIG. 1, the tape movement constraint comprises at least one tape roller bearing, and preferably comprises two tape roller bearings 60 and 61, positioned along the tape path at either side of and closely adjacent the tape head 15. Alternatively, tape roller bearings 60 and 61 may be located within a removable cartridge, for example, replacing the stationary bearings in an IBM 3570 tape cartridge. When the cartridge is placed in the drive, the tape roller bearings 60 and 61 are positioned along the tape path, and closely adjacent the tape head 15. Elements 112 and 113 may comprise conventional tape guides for reducing the amplitudes of the lateral transient movement, or may comprise additional tape movement constraint roller bearings.

Figure 14:
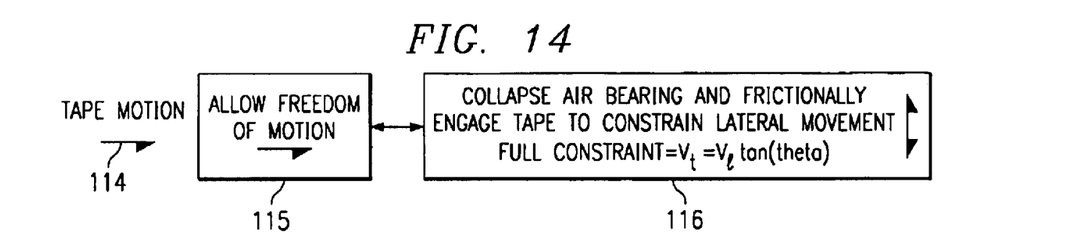
FIG. 14 is a diagrammatic representation depicting the method of the present invention.

In summary, the method of the present invention is illustrated in FIG. 14, wherein the tape movement constraint comprises at least one tape roller bearing for positioning along the tape path in the direction of tape motion 114 for contacting a surface of the tape. The tape roller bearing is rotatable about a central axis parallel to the cylindrical peripheral surface in step 115, allowing the tape freedom of movement in the longitudinal direction. Simultaneously, in step 116, the cylindrical peripheral surface comprises a frictional surface for contacting and engaging the surface of the tape, rather than at an edge, constraining movement of the tape in the lateral direction, and exerting substantial lateral drag, while step 115 allows the tape to move freely with the tape roller bearing cylindrical surface in a direction perpendicular to the central axis as the tape roller bearing rotates. The lateral constraint of step 116 substantially reduces the rate of the lateral transient movement while preventing an undesirable increase in longitudinal drag and stresses on the tape. In step 116, in one embodiment, any potential air bearing that could form between the surface of the tape and the surface of the roller bearing, e.g., due to the air drawn along by the tape as it is moved rapidly, is collapsed to insure that the roller bearing frictionally contacts and engages the surface of the tape.

While the preferred embodiments of the present invention have been illustrated in detail, it should be apparent that modifications and adaptations to those embodiments may occur to one skilled in the art without departing from the scope of the present invention as set forth in the following claims.

We claim:

1. A tape movement constraint for a tape drive system, said tape drive system for moving a tape along a tape path in a longitudinal direction across a tape head, said tape having tracks extending in said longitudinal direction, said tape head having a track following servo system for moving said head in a lateral direction with respect to said longitudinal direction for following lateral movement of said longitudinal tracks as said tape is moved in said longitudinal direction, said tape subject to lateral transient movement, said tape movement constraint comprising:

at least one tape roller bearing for positioning along said tape path closely adjacent said tape head, having a cylindrical peripheral surface parallel to said lateral direction of said tape and extending a length greater than the width of said tape, for contacting a surface of said tape; said tape roller bearing rotatable about a central axis parallel to said cylindrical peripheral surface, allowing said tape freedom of movement in said longitudinal direction; said cylindrical peripheral surface comprising a frictional surface for contacting and engaging said surface of said tape and constraining movement of said tape in said lateral direction; wherein said tape roller bearing frictional cylindrical peripheral surface comprises a plurality of lands separated by grooves, said lands extending about said cylindrical peripheral surface in a circumferential direction generally parallel to said longitudinal direction, said grooves allowing entrapped air to bleed from between said tape and said cylindrical peripheral surface to collapse any air bearing and provide contact between said tape surface and said lands for engaging said surface of said tape; thereby reducing the rate of said lateral transient movement of said tape to allow said track following servo system to follow said reduced rate lateral transient movement of said longitudinal tracks; wherein said lands and said grooves extend in said circumferential direction at an acute angle to said longitudinal direction forming a helical pattern extending laterally a length less than said width of said tape; and wherein said cylindrical peripheral surface additionally comprises a smooth cylindrical surface at each side of said land and groove helical pattern to support each edge of said tape.

2. The tape movement constraint of claim 1, wherein said grooves extend in a double helix crossing pattern, such that said lands form islands for engaging said surface of said tape.

3. A tape drive system for moving a tape in a longitudinal direction along a tape path, said tape having tracks extending in said longitudinal direction, said tape subject to lateral transient movement, comprising:

drive reels for moving said tape longitudinally along said tape path;

a tape head positioned in said tape path such that said tape is moved thereacross in said longitudinal direction;

a track following servo system for moving said head in a lateral direction with respect to said longitudinal direction for following lateral movement of said longitudinal tracks as said tape is moved in said longitudinal direction;

at least one tape roller bearing positioned along said tape path closely adjacent said tape head, having a cylindrical peripheral surface parallel to said lateral direction of said tape and extending a length greater than the width of said tape, for contacting a surface of said tape; said tape roller bearing rotatable about a central axis parallel to said cylindrical peripheral surface, allowing said tape freedom of movement in said longitudinal direction; said cylindrical peripheral surface comprising a frictional surface for contacting and engaging said surface of said tape and constraining movement of said tape in said lateral direction; wherein said drive reels are bidirectional, moving said tape in either longitudinal direction along said tape path, said tape drive system comprising a plurality of said tape roller bearings, one of said tape roller bearings positioned along said tape path at either side of and closely adjacent said tape head; wherein said frictional cylindrical peripheral surface of each of said tape roller bearings comprises a plurality of lands separated by grooves, said lands extending about said cylindrical peripheral surface in a circumferential direction generally parallel to said longitudinal direction, said grooves allowing entrapped air to bleed from between said tape and said cylindrical peripheral surface to collapse any air bearing and provide contact between said tape surface and said lands for engaging said surface of said tape; thereby reducing the rate of said lateral transient movement of said tape to allow said track following servo system to follow said reduced rate lateral transient movement of said longitudinal tracks; wherein said tape roller bearing frictional cylindrical peripheral surface lands and grooves extend in said circumferential direction at an acute angle to said longitudinal direction forming a helical pattern extending laterally a length less than said width of said tape; and wherein said cylindrical peripheral surface additionally comprises a smooth cylindrical surface at each side of said land and groove helical pattern to support each edge of said tape.

4. A roller bearing for constraining lateral tape movement for a tape drive system, said tape drive system for moving a tape along a tape path in a longitudinal direction across a tape head, said tape having tracks extending in said longitudinal direction, said tape head having a track following servo system for moving said head in a lateral direction with respect to said longitudinal direction for following lateral movement of said longitudinal tracks as said tape is moved in said longitudinal direction, said tape subject to lateral transient movement, said roller bearing for positioning along said tape path closely adjacent said tape head, comprising:

a central axis parallel to said lateral direction of said tape; and a cylindrical peripheral surface parallel to said central axis extending a length greater than the width of said tape, for contacting a surface of said tape, which is allowed to rotate about said central axis, providing freedom of movement for said tape in said longitudinal direction; said cylindrical peripheral surface comprising a frictional surface for contacting and engaging said surface of said tape and constraining movement of said tape in said lateral direction; wherein said tape roller bearing frictional cylindrical peripheral surface comprises a plurality of lands separated by grooves, said lands extending about said cylindrical peripheral surface in a circumferential direction generally parallel to said longitudinal direction, said grooves allowing entrapped air to bleed from between said tape and said cylindrical peripheral surface to collapse any air bearing and provide contact between said tape surface and said lands for engaging said surface of said tape; thereby reducing the rate of said lateral transient movement of said tape to allow said track following servo system to follow said reduced rate lateral transient movement of said longitudinal tracks; wherein said lands and said grooves extend in said circumferential direction at an acute angle to said longitudinal direction forming a helical pattern extending laterally a length less than said width of said tape; and wherein said cylindrical peripheral surface additionally comprises a smooth cylindrical surface at each side of said land and groove helical pattern to support each edge of said tape.

5. The roller bearing of claim 4, wherein said grooves extend in a double helix crossing pattern, such that said lands form islands for engaging said surface of said tape.

* * * * *

UNITED STATES PATENT AND TRADEMARK OFFICE
CERTIFICATE OF CORRECTION

PATENT NO. : 6,754,033 B1
DATED : June 22, 2004
INVENTOR(S) : Argumedo et al.

It is certified that error appears in the above-identified patent and that said Letters Patent is hereby corrected as shown below:

Title page,
Item [*] Notice, change "U.S.C. 154(b) bydays.days." to -- U.S.C. 154(b) by 403 days. --

Column 3,
Line 23, change "The fullest reduction is the" to -- The fullest reduction in the --

Signed and Sealed this

Tenth Day of August, 2004

JON W. DUDAS
*Acting Director of the United States Patent and Trademark Office*